United States Patent
Glasser

(10) Patent No.: US 10,175,367 B2
(45) Date of Patent: Jan. 8, 2019

(54) TOOL FOR DETECTING PHOTON RADIATION, PARTICULARLY ADAPTED FOR HIGH-FLUX RADIATION

(71) Applicant: Commissariat A L'Energie Atomique et Aux Energies, Paris (FR)

(72) Inventor: Francis Glasser, Eybens (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/121,099

(22) PCT Filed: Feb. 24, 2015

(86) PCT No.: PCT/FR2015/050437
§ 371 (c)(1),
(2) Date: Aug. 24, 2016

(87) PCT Pub. No.: WO2015/128574
PCT Pub. Date: Sep. 3, 2015

(65) Prior Publication Data
US 2017/0017000 A1    Jan. 19, 2017

(30) Foreign Application Priority Data
Feb. 27, 2014    (FR) ...................................... 14 51610

(51) Int. Cl.
*G01T 1/17*    (2006.01)
*G01T 1/24*    (2006.01)
(52) U.S. Cl.
CPC ................ *G01T 1/247* (2013.01); *G01T 1/17* (2013.01)
(58) Field of Classification Search
CPC .................................. G01T 1/17; G01T 1/247
See application file for complete search history.

(56) References Cited

U.S. PATENT DOCUMENTS

| 7,652,242 B2 * | 1/2010 | Ouvrier-Buffet ......... G01T 1/17 250/214 R |
| 9,689,994 B2 * | 6/2017 | Rinkel ..................... G01T 1/171 |
| 2012/0184848 A1 * | 7/2012 | Ohi ....................... G01T 1/1647 600/436 |

FOREIGN PATENT DOCUMENTS

| EP | 2071722 A1 | 6/2009 |
| FR | 2681703 A1 | 3/1993 |

(Continued)

OTHER PUBLICATIONS

International Search Report of WIPO Publication No. 2015/128574 A1 dated Sep. 3, 2015, 4 pages.

*Primary Examiner* — David Porta
*Assistant Examiner* — Faye Boosalis
(74) *Attorney, Agent, or Firm* — Brinks Gilson & Lione

(57) ABSTRACT

A tool for detecting radiation includes a semiconductor detector material that interacts with ionizing radiation, an electrode that collects charge carriers generated in the detector material from an interaction with the ionizing radiation. A shaping circuit forms electrical pulses having a shape that depends on the amount of collected charge. A counting circuit counts the number of pulses and includes a counter and an incrementing element that increments the counter when a comparison parameter exceeds a threshold. The counting circuit further includes a duration-measuring element that measures a pulse duration (f) for each pulse and a peak-detecting element that determines a maximum amplitude (H) of each pulse. A combining element combines maximum amplitude and the pulse duration (f) to establish the comparison parameter. The comparison parameter is the product (H×t) of a maximum amplitude of the pulse and the corresponding pulse duration.

6 Claims, 3 Drawing Sheets

(56) References Cited

FOREIGN PATENT DOCUMENTS

| | | |
|---|---|---|
| FR | 2759837 A1 | 8/1998 |
| FR | 2790560 A1 | 9/2000 |
| WO | 2012066350 | 5/2012 |

\* cited by examiner

TOOL FOR DETECTING PHOTON RADIATION, PARTICULARLY ADAPTED FOR HIGH-FLUX RADIATION

RELATED APPLICATION

This application is a PCT Nationalization of PCT Application No. PCT/FR2015/050437, filed Feb. 24, 2015, which claims priority to French Patent Application No. 1451610, filed Feb. 27, 2014, the entire contents of which are hereby incorporated by reference.

TECHNICAL FIELD

The invention concerns a tool for detecting photon radiation. Such a detection tool is in particular used in the fields of medical imaging, in particular in radiology or in X-ray scanners, astronomical imaging, the nuclear industry and industrial inspection. The invention is particularly adapted to high-flux X-ray radiation, such as that of an X-ray scanner.

BACKGROUND

The known detection tools are essentially constituted by a detector, a collimator and information technology means for processing.

The collimator makes it possible to select the photons arriving on the detector. It is formed by channels delimited by septa.

The detector may comprise a scintillator material, such as Cesium Iodide, Sodium Iodide, Lanthanum Bromide (LaBr$_3$) or Bismuth Germanate (BGO), which is associated with photodetectors, for example an array of photodiodes. Alternatively, the detector comprises at least one semiconductor detector material, for example CdTe or CdZnTe, capable of being polarized by a cathode and an anode, these electrodes generally being disposed on two opposite faces of a block of semiconductor material. This is then referred to as a semiconductor detector.

When a photon penetrates the semiconductor material and interacts with it, all or some of its energy is transferred to charge carriers (electron-hole pairs) in the semiconductor material. Because the detector is polarized, the charge carriers migrate towards the electrodes (including the anode). They are collected there to produce an electrical signal. This electrical signal, which is a succession of pulses of which the amplitude is proportional to the energy deposited by a photon when an interaction occurs, is then processed. According to the nature of the detector, the signal is collected solely at the anode (this is the most frequent case), solely at the cathode, or at both electrodes. A semiconductor detector usually comprises a plurality of physical pixels, each physical pixel corresponding to a circuit for charge collection by an electrode.

Three operating modes are known for detection tools with a semiconductor detector: the integration mode, the spectrometric mode and the photon counting mode.

In the integration mode, integration type electronics measures the current coming from each electrode for a given period of time, typically a few hundreds of µs. This current is the sum of the dark current, part of the current created by the incident radiation during that period and part of the current created during the preceding period, the latter being called smearing of the signal). The integration mode is well-adapted for radiology although hindered by the dark current and the smearing of the signals. In an X-ray scanner, with rapid variations in incident flux of a few decades, the smearing of the signals is prohibitive and the integration mode cannot function.

In the spectrometric mode, the current output from each electrode is amplified by a charge preamplifier and shaped with a time constant of the order of 1 µs. The measurement of this charge represents the energy of the incident photon. The spectrometric mode enables precise measurement of the energy of the incident photons but is not sufficiently fast for an X-ray scanner type application in which the incident stream of photons is greater than $10^9$ photons/s·mm$^2$.

In the photon counting mode, the current output from each electrode is amplified by a current preamplifier and is compared with a threshold, referred to as counting threshold. This counting threshold makes it possible to discriminate a low amplitude interaction, which will be rejected, from a significant amplitude interaction, which will be taken into account. Typically, the counting threshold may be equivalent to an energy of 25 keV, only the interactions releasing greater energy being taken into account, and thus counted.

The typical duration of the pulses of a signal for an X-ray scanner type application is of the order of 5 to 15 ns. If the pulse amplitude studied is greater than the counting threshold, a counter increments. The counting mode for the photons is compatible with high fluxes, the detector count rate being in particular greater than 1 Mcount/s/mm$^2$. At such count rates, there is no question of making an accurate measurement of the energy deposited by each interaction. Common devices merely make a measurement of the amplitude, that is to say the maximum level, of each pulse produced by the detector.

However, at such count rates, perturbations may affect the detector, affecting the stability of the detector response. Thus, for the same energy released in the detector, the shape of the pulses may drift, the pulses being less high and longer. It can be understood that mere amplitude thresholding is reaching its limits. As a matter of fact, interactions releasing the same energy may give rise to pulses of which the maximum amplitude is different, which leads to a degradation in the energy resolution.

It has for example been found that when a detector is exposed to an intense and constant incident flux, the number of pulses counted, that is to say the number of pulses exceeding a predetermined amplitude threshold, reduces.

Such a drift may prove to be critical, in particular in the case of an X-ray scanner in which small variations of an electrode relative to another of a few per thousand lead to artefacts when reconstructing an image.

SUMMARY

The invention is directed to providing a radiation detection device adapted for high fluxes of incident photons, that is to say a tool enabling fast counting of each photon, in this taking after devices operating in the photon counting mode, and which is more reliable, in particular at high count rates.

In terms of reliability, an objective of the invention is to provide a detection tool having a small drift, for example less than 1%.

To that end, the invention provides a tool for detecting radiation comprising:

a detector material, adapted to interact with an ionizing radiation; it is to be noted that the detector material may be a scintillator material or, preferably, a semiconductor material, an electrode, for collecting charge carriers generated in the detector material under the effect of an interaction with the ionizing radiation; it is to be noted that the expression "charge carriers" here covers, exceptionally, not only the electron-hole pairs generated in the case of a semiconductor detector material but also photons generated in the case of a scintillator detector material (the term "electrode" then designating a photodiode), a shaping circuit for shaping an electrical pulse having a shape depending on the quantity of charges collected, a counting circuit for counting the number of pulses formed, comprising a counter and an incrementing element for incrementing the counter when a comparison parameter exceeds a counting threshold.

Of course, the tool is defined and described with an electrode in the interest of simplicity; but usually, it comprises a multitude of electrodes (pixels) organized in an array, and the characteristics defined in relation with the electrode are to be found for each of the electrodes of the matrix.

The radiation detection device according to the invention is characterized in that it comprises:
  a duration measuring element for measuring a pulse duration for each pulse formed,
  a peak detecting element, for determining a maximum amplitude of each pulse formed,
  a combining unit, adapted to combine said maximum amplitude and said pulse duration, to determine a comparison parameter,
  an element adapted for determining said comparison parameter, according to the pulse duration and said maximum amplitude.

The invention thus differs from the known counting mode in that the counting is not carried out solely according to a maximum pulse amplitude, but according to both the maximum amplitude of the pulse formed and an additional piece of information on the temporal shape of the pulse.

The use of this additional temporal information makes it possible to compensate for the drifts referred to previously. As a matter of fact, the inventor has established that in the case of a semiconductor detector, such a drift could be explained, at least partly, by the following phenomenon. A space charge created by a high flux will very slightly modify the field electric close to the anodes and thus deform the temporal response. For the same energy deposited by a photon, the pulse will then be slower and thus the amplitude smaller. As the energy spectrum of the photons which it is attempted to count is continuous, some of the pulses of which the amplitude is close to the threshold will pass below the counting threshold and will therefore not be taken into account.

In other words, the invention consists of counting pulses, not on the basis of their amplitude, but on the basis of a comparison parameter as close as possible to the integral of the pulse formed (the integral of the pulse formed for a photon having interacted with the detector material representing the energy deposited by the photon at the time of interaction) while maintaining a dead time between two detected pulses that is a short as possible.

In an embodiment of the invention, which is particularly simple and efficient, a counting circuit comprises a multiplying element for multiplying, for each pulse, a maximum amplitude H measured for the pulse by the corresponding pulse duration t and in that the comparison parameter is the product (H×t) coming from the multiplying element, the counting threshold having a fixed predetermined value, that is to say that it stays the same at least during the same detection operation.

This fixed predetermined value may be adjusted experimentally, according to the change in the count rate, that is to say the number of pulses counted per unit time.

The inventor has established that the product H×t from the aforementioned multiplying element provides an approximation of the integral of the pulse that is sufficient to reduce the drift in the measurement to less than 1%.

Furthermore, several embodiments are possible for measuring the pulse duration. According to a first embodiment, the pulse duration measured corresponds to the time that elapses between the time at which the pulse exceeds a detection threshold and the time at which it falls back below that same threshold. The detection threshold may in particular correspond to the amplitude short of which the signal formed corresponds solely to the detector noise and beyond which it can be considered that the pulse formed expresses the presence of an interaction in the semiconductor material. To implement this first embodiment, the measuring element is chosen between a clock with a fixed frequency, or a capacitance supplied by a source of direct current.

According to a second embodiment, the measured pulse duration corresponds to the time that elapses between the time at which the pulse exceeds the detection threshold, which may be that defined in the preceding paragraph, and the time at which it attains its maximum level (time at which the signal presents an inversion). In other words, the pulse duration corresponds to the time of signal increase. This second embodiment is advantageous when the incident flux is very high. As a matter of fact, this embodiment only takes into account the first part of the pulse, corresponding to the rise towards the maximum level, this first part being less subject to smearing phenomena. To implement this second embodiment, the measuring element can be similar to that referred to previously.

The measurement dynamic for the pulse duration in both above-mentioned forms of embodiment may attain 20 ns with a temporal resolution of 20 ps.

The shaping circuit may comprise a charge preamplifier, downstream of which is disposed a delay line circuit, the pulse being shaped by subtracting the signal provided by the charge preamplifier from the signal provided by the delay line circuit. Such a shaping circuit is described in the application EP2071722. That said, performance degrades when the count rate increases, in particular due to the delay imposed by the delay line.

Preferably, the shaping circuit comprises a current preamplifier. In general, when it is sought to determine the integral of a pulse accurately, in particular for spectrometry type applications, this type of preamplifier is not used since it is reputed to be noisy. However, a current preamplifier is well-suited to the detection tool according to the invention, since a simple estimation of the integral of each pulse suffices for the objective sought. Furthermore, this type of preamplifier is better suited to high fluxes since it produces short pulses, of the same order of magnitude as the pulses produced by the electrodes, typically of 5 to 15 ns width.

The invention extends to a detection tool characterized in combination by all or some of the features described above and below.

BRIEF DESCRIPTION OF THE DRAWING

Other details and advantages of the present invention will appear from the reading of the following description, which refers to the diagrammatic appended drawings and which relates to a preferred embodiment, provided by way of non-limiting example. In the drawings.

DETAILED DESCRIPTION

Figure 1:
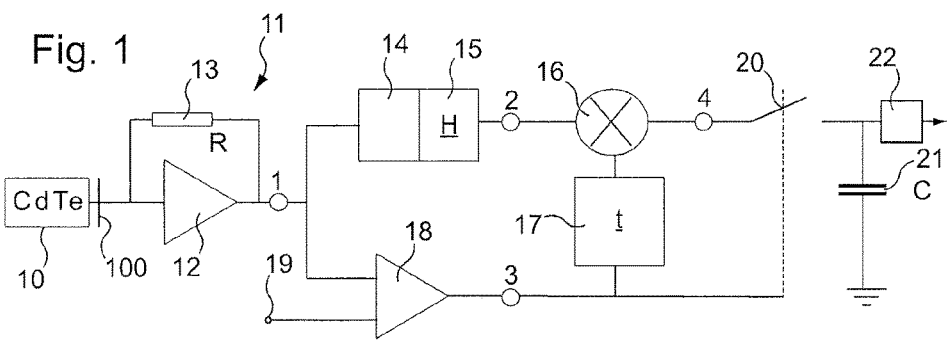
FIG. 1 is a diagram of a shaping and counting circuit of a detection tool according to the invention.
Figure 2:
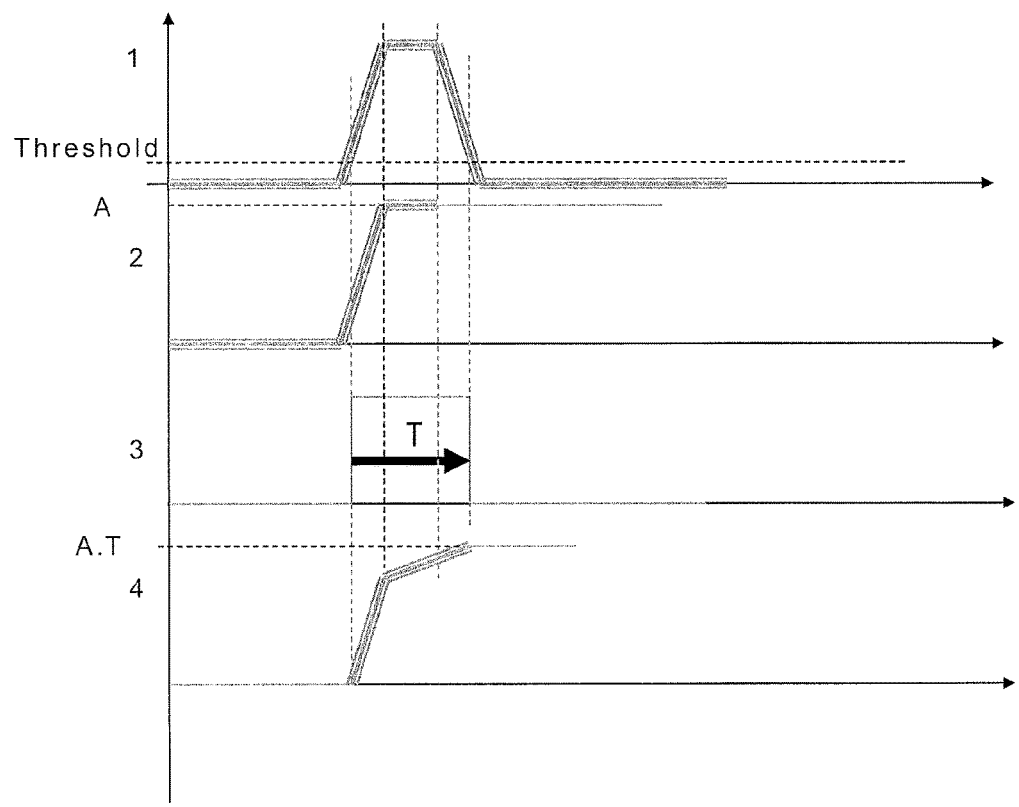
FIG. 2 is a diagram of a pulse formed for an interaction of photons in the detection tool of FIG. 1.
Figure 5:
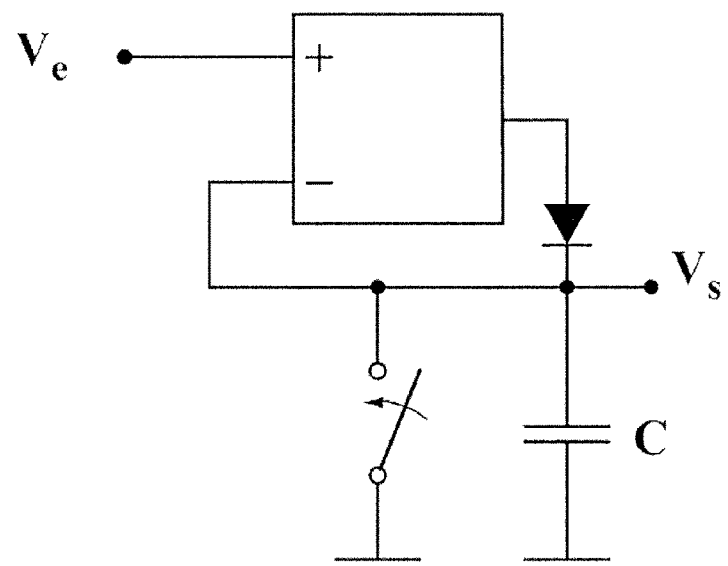
FIG. 5 is a diagram of a known measuring element for measuring the maximum amplitude of the pulses of a signal.

FIG. 1 illustrates an embodiment of a detection tool according to the invention, comprising a detector 10, a shaping circuit and a counting circuit. The shaping circuit comprises at the output from each electrode 100 of the detector 10, a current/voltage converter 11 formed for example by an operational amplifier 12 and a resistor 13 mounted in parallel. This current/voltage converter 11 constitutes a current preamplifier. The signal 1 (illustrated in FIG. 2) obtained at the output from this current/voltage converter 11 is expressed, for each photon interaction with the detector material, as a pulse. This pulse is generally not symmetrical. Its amplitude varies according to the energy but also, for the same energy, according to the count rate, on account of the drifts referred to earlier which affect the detection tool. The shaping and counting circuits next comprise a peak detecting element 15, enabling the maximum amplitude H for each pulse of the signal 1 to be measured. Optionally, the peak detecting element incorporates a correcting circuit for correcting the shape of the pulse, in order for the latter to have for example a shape close to being Gaussian-shaped. The peak detecting element 15 may be that illustrated in FIG. 5. When the maximum amplitude H has been attained, the module 15 delivers a signal equal to that maximum amplitude. The switch of FIG. 5 is closed so as to supply the capacitance after the amplitude of a pulse has attained its maximum.

The measured value H is input to a multiplying element (or "multiplier") 16. In parallel, the signal 1 coming out from the current/voltage converter is input into a comparator 18 in which its amplitude is compared with a threshold $H_s$ signal 19, referred to as detection threshold, to measure the duration t, referred to as pulse duration, that elapses between the time at which the (rising) pulse of the signal 1 exceeds the detection threshold $H_s$ and the time at which the (falling) pulse returns to being less than the detection threshold $H_s$. This measurement of duration is made by a duration measuring element 17. The measured value t is input to a multiplying element 16.

At the output from the multiplying element 16, the potential depends on the product H×t. When the amplitude of the pulse returns below the detection threshold Hs, the switch 20 is open. Thus, the potential difference, at the terminals of the capacitor C, depends on H×t, in which t is the pulse duration. Downstream, the counting circuit comprises a counter 22 that includes an incrementing element.

This counter only takes into account the pulses of which the product H×t exceeds a threshold, referred to as counting threshold.

Figure 3:
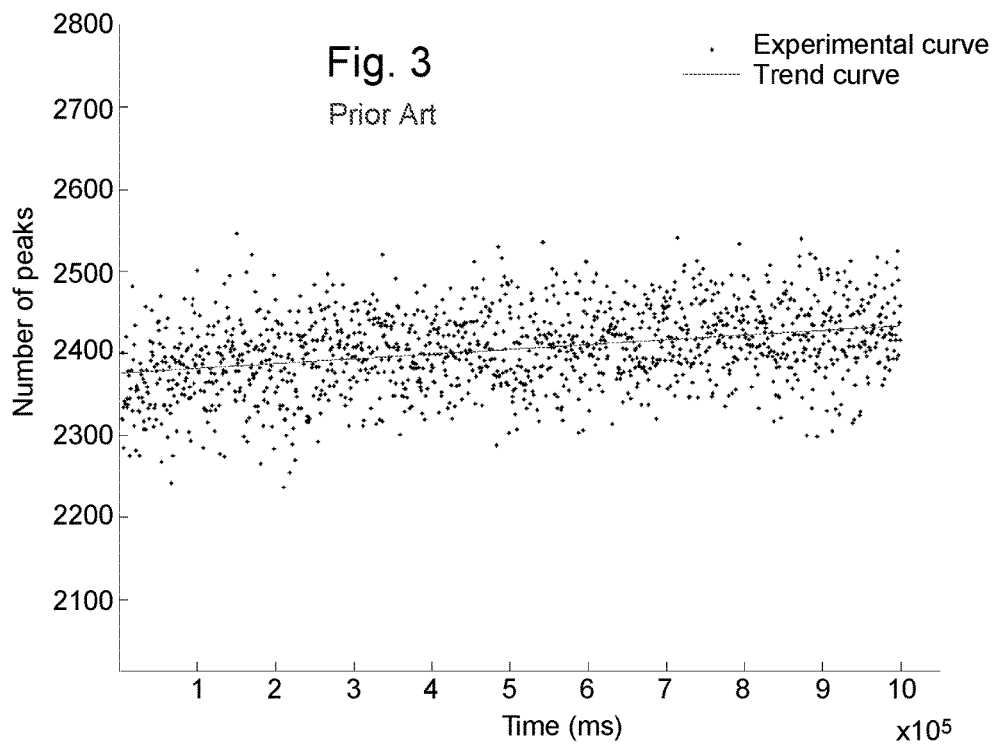
FIG. 3 is a diagram of the change in the number of peaks counted against time in a detection tool of the prior art operating according to the conventional counting mode using only the amplitude of the pulses as a comparison parameter.

FIG. 3 illustrates the change in the number of peaks counted against time in a detection tool of the prior art operating according to the conventional counting mode using only the pulse amplitude as a comparison parameter. A drift of 2.5% is observed.

Figure 4:
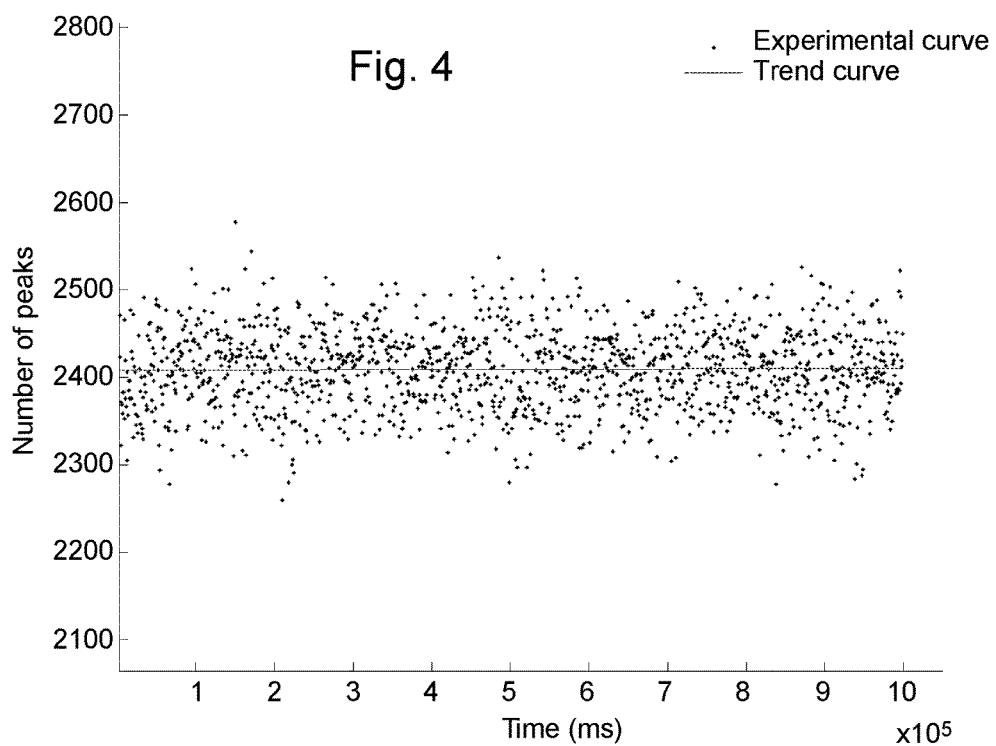
FIG. 4 is a diagram of the change in the number of peaks counted against time in a detection tool according to the invention such as that of FIG. 1, operating according to a counting mode according to the invention using as a comparison parameter the product H×t of the maximum amplitude multiplied by the pulse duration.

FIG. 4 illustrates the change in the number of peaks counted against time in a detection tool according to the invention such as that of FIG. 1, using as comparison parameter the product H×t of the amplitude and the pulse duration. A drift of 0.7% is observed.

The invention may be the object of numerous variants relative to the embodiment illustrated, provided those variants enter within the scope of the appended claims.

The invention claimed is:

1. A detection device comprising:
   a detector material adapted to interact with an ionizing radiation;
   an electrode configured to collect charge carriers generated in the detector material from an interaction with the ionizing radiation;
   a shaping circuit configured to shape electrical pulses having a shape depending on the quantity of charges collected for each interaction;
   a counting circuit configured to count a number of the electrical pulses, the counting circuit comprising a counter and an incrementing element for incrementing the counter when a comparison parameter exceeds a counting threshold;
   wherein the counting circuit further comprises:
   a duration measuring element configured to measure a pulse duration (t) for each electrical pulse;
   a peak detecting element configured to determine a maximum amplitude (H) of each electrical pulse; and
   a combining unit configured to combine the maximum amplitude (H) and the pulse duration (t) to establish the comparison parameter;
   wherein the combining unit comprises a multiplying element for multiplying, for each electrical pulse, the maximum amplitude (H) measured for the electrical pulse by the corresponding pulse duration (t) and wherein the comparison parameter is a product (H×t) of the multiplying element.

2. The detection device according to claim 1, wherein the duration measuring element comprises a clock with a fixed frequency, or a capacitance supplied by a source of direct current.

3. The detection device according to claim 1, wherein the shaping circuit comprises a charge preamplifier and a delay line.

4. The detection device according to claim 1, wherein the shaping circuit comprises a current preamplifier.

5. A detection device comprising:
   a detector material adapted to interact with an ionizing radiation;
   an electrode configured to collect charge carriers generated in the detector material from an interaction with the ionizing radiation;
   a shaping circuit configured to shape electrical pulses having a shape depending on the quantity of charges collected for each interaction;
   a counting circuit configured to count a number of the electrical pulses, the counting circuit comprising a counter and an incrementing element for incrementing the counter when a comparison parameter exceeds a counting threshold;

wherein the counting circuit further comprises:

a duration measuring element configured to measure a pulse duration (t) for each electrical pulse;

a peak detecting element configured to determine a maximum amplitude (H) of each electrical pulse; and a combining unit configured to combine the maximum amplitude (H) and the pulse duration (t) to establish the comparison parameter, wherein the pulse duration (t) corresponds to a time that elapses between a time at which the electrical pulse exceeds a detection threshold (Hs) and a time at which it falls back below the detection threshold.

6. A detection device comprising:

a detector material adapted to interact with an ionizing radiation;

an electrode configured to collect charge carriers generated in the detector material from an interaction with the ionizing radiation;

a shaping circuit configured to shape electrical pulses having a shape depending on the quantity of charges collected for each interaction;

a counting circuit configured to count a number of the electrical pulses, the counting circuit comprising a counter and an incrementing element for incrementing the counter when a comparison parameter exceeds a counting threshold;

wherein the counting circuit further comprises:

a duration measuring element configured to measure a pulse duration (t) for each electrical pulse;

a peak detecting element configured to determine a maximum amplitude (H) of each electrical pulse; and a combining unit configured to combine the maximum amplitude (H) and the pulse duration (t) to establish the comparison parameter, wherein the electrical pulse duration corresponds to a time that elapses between a time at which the electrical pulse exceeds an amplitude threshold (Hs) and a time at which it attains the maximum amplitude (H).

\* \* \* \* \*

UNITED STATES PATENT AND TRADEMARK OFFICE
CERTIFICATE OF CORRECTION

PATENT NO. : 10,175,367 B2
APPLICATION NO. : 15/121099
DATED : January 8, 2019
INVENTOR(S) : Francis Glasser Page 1 of 1

It is certified that error appears in the above-identified patent and that said Letters Patent is hereby corrected as shown below:

On the Title Page

Item (71), after "Energies" add "Alternatives"

Signed and Sealed this
Twenty-first Day of April, 2020

Andrei Iancu
*Director of the United States Patent and Trademark Office*